United States Patent
Burgos et al.

(10) Patent No.: US 10,032,093 B2
(45) Date of Patent: Jul. 24, 2018

(54) METHOD AND DEVICE FOR DETERMINING THE SHAPE OF AN OBJECT REPRESENTED IN AN IMAGE, CORRESPONDING COMPUTER PROGRAM PRODUCT AND COMPUTER-READABLE MEDIUM

(71) Applicant: THOMSON LICENSING, Issy les Moulineaux (FR)

(72) Inventors: Xavier Burgos, Barcelona (ES); Nezha Kabbaj, Rennes (FR); Francois Le Clerc, L'Hermitage (FR)

(73) Assignee: THOMSON LICENSING, Issy les Moulineaux (FR)

( * ) Notice: Subject to any disclaimer, the term of this patent is extended or adjusted under 35 U.S.C. 154(b) by 6 days.

(21) Appl. No.: 15/249,440

(22) Filed: Aug. 28, 2016

(65) Prior Publication Data

US 2017/0061253 A1    Mar. 2, 2017

(30) Foreign Application Priority Data

Aug. 28, 2015 (EP) .................................. 15306330

(51) Int. Cl.
*G06K 9/62* (2006.01)
*G06K 9/52* (2006.01)
(Continued)

(52) U.S. Cl.
CPC ....... *G06K 9/6267* (2013.01); *G06K 9/00281* (2013.01); *G06K 9/52* (2013.01);
(Continued)

(58) Field of Classification Search
USPC ........................................................ 382/159
See application file for complete search history.

(56) References Cited

U.S. PATENT DOCUMENTS

| 6,240,198 B1 * | 5/2001 | Rehg ................. G06K 9/00369 382/103 |
| 8,023,708 B2 | 9/2011 | Dewaele et al. |

(Continued)

FOREIGN PATENT DOCUMENTS

WO    WO2014037709    3/2014

OTHER PUBLICATIONS

Agarwal et al., "Recovering 3D Human Pose from Monocular Images", IEEE Transactions on Pattern Analysis and Machine Intelligence, vol. 28, No. 1, Jan. 2006, pp. 44-58.

(Continued)

*Primary Examiner* — Jerome Grant, II
(74) *Attorney, Agent, or Firm* — Brian J. Dorini; Patricia A. Verlangieri (57) ABSTRACT

The disclosure relates to a method for determining the shape ($S^r$) of an object represented in a current image, a plurality of landmarks being associated with the object. According to the disclosure, the method includes determining a plurality of features ($F^r$) representative of the current image, and the features being determined from at least a part of the plurality of landmarks. The method further obtains information ($S^r$) representative of the shape of the object by using at least one parameter ($P^r$) representative of an estimation of the pose of the object in the current image, the at least one parameter being obtained by implementing a multivariate regression applied to at least a part of the set of features.

23 Claims, 3 Drawing Sheets

(51) Int. Cl.
*G06K 9/66* (2006.01)
*G06T 7/00* (2017.01)
*G06K 9/00* (2006.01)

(52) U.S. Cl.
CPC ............. *G06K 9/6215* (2013.01); *G06K 9/66* (2013.01); *G06T 7/004* (2013.01); *G06K 9/00248* (2013.01); *G06K 9/00268* (2013.01)

(56) References Cited

U.S. PATENT DOCUMENTS

| | | | | |
|---|---|---|---|---|
| 8,131,038 | B2* | 3/2012 | Saddi | G06K 9/6209 |
| | | | | 382/128 |
| 9,619,704 | B2* | 4/2017 | Hasler | G06K 9/00536 |
| 9,691,165 | B2* | 6/2017 | Bermano | G06T 11/003 |
| 9,734,435 | B2* | 8/2017 | Krupka | G06K 9/6267 |
| 9,753,131 | B2* | 9/2017 | Adib | G01S 13/42 |
| 9,764,467 | B2* | 9/2017 | Harada | B25J 9/1612 |
| 9,773,196 | B2* | 9/2017 | Sachs | G06K 9/66 |
| 9,779,296 | B1* | 10/2017 | Ma | G06K 9/00463 |
| 2006/0210168 | A1 | 9/2006 | Kim et al. | |
| 2010/0214290 | A1 | 8/2010 | Shiell et al. | |
| 2014/0185924 | A1 | 7/2014 | Cao et al. | |

OTHER PUBLICATIONS

Bossa et al., "Multi-Object Statistical Pose+Shape Models", 4th IEEE International Symposium on Biomedical Imaging: From Nano to Macro, Arlington, Virginia, USA, Apr. 12, 2007, pp. 1204-1207.

Salazar et al., "Feature Extraction & Lips Posture Detection Oriented to the Treatment of CLP Children", Annual International Conference of the IEEE Engineering in Medicine and Biology Society, New York City, New York, USA, Aug. 30, 2006, pp. 5747-5740.

Uzunbas et al., "Coupled Nonparametric Shape and Moment-Based Intershape Pose Priors for Multiple Basal Ganglia Structure Segmentation", IEEE Transactions on Medical Imaging, vol. 29, No. 12, Dec. 2010, pp. 1959-1978.

Dollar et al., "Cascaded Pose Regression", 2010 IEEE Conference on Computer Vision and Pattern Recognition, San Francisco, California, USA, Jun. 13, 2010, pp. 1-8.

Gross et al., "Multi-PIE", 8th IEEE International Conference on Automatic Face & Gesture Recognition, Amsterdam, Netherlands, Sep. 17, 2008, pp. 1-22.

Pearson, K., "On Lines and Planes of Closest Fit to Systems of Points in Space", Philosophical Magazine, vol. 2, No. 6, 1901, pp. 559-572.

Iversen et al., "Shape Dependency of ICP Pose Uncertainties in the Context of Pose Estimation Systems", 10th International Conference on Computer Vision Systems, Copenhagen, Denmark, Jul. 6, 2015, pp. 303-315.

Anas et al., "A Statistical Shape+Pose Model for Segmentation of Wrist CT Images", Mdeical Imaging 2014: Image Processing, SPIE vol. 9034, Mar. 21, 2014, pp. 1-8.

Dantone et al., "Real-time Facial Feature Detection using Conditional Regression Forests", IEEE Conference on Computer Vision and Pattern Recognition, Providence, Rhode Island, USA, Jun. 16, 2012, pp. 2578-2585.

Murphy-Chutorian et al., "Head Pose Estimation in Computer Vision: A Survey", IEEE Transactions on Pattern Analysis and Machine Intelligence, vol. 31, No. 4, Apr. 2009, pp. 607-626.

* cited by examiner

Fig. 2

Fig. 3(a) First PC (similar to yaw) explains 77% of variance

Fig. 3(b) Second PC (similar to roll) explains 7% of variance

Fig. 3(c) Third PC (similar to pitch) explains 5% of variance

Fig. 3(d) Fourth PC (similar to pitch + scaling) explains 3% of variance

METHOD AND DEVICE FOR DETERMINING THE SHAPE OF AN OBJECT REPRESENTED IN AN IMAGE, CORRESPONDING COMPUTER PROGRAM PRODUCT AND COMPUTER-READABLE MEDIUM

This application claims the benefit, under 35 U.S.C. § 119 of European Patent Application No. 15306330.0, filed Aug. 28, 2015.

1. TECHNICAL FIELD

The present disclosure relates to computer vision and more specifically to the computer vision problem of finding and identifying a given semantic category, i.e. objects, in an image or video sequence, also known as object recognition. More specifically, the present disclosure relates to correctly determining the shape of objects in images.

The principles of the present disclosure find particular application in any field implementing object recognition such as facial animation, human computer interaction, eye gaze correction for video conferencing, face retouching, forensics or detecting an animal and estimating its exact body pose.

2. TECHNICAL BACKGROUND

One of the major benefits of the increase in computational power has been a steady rise in the number of computer vision applications. Computer vision problems formerly impossible to solve in any reasonable amount of time have become more and more feasible.

Efficiently detecting and classifying objects in an image or video sequence is one of the main challenges of computer vision. Detection consists of giving a one-bit answer to the question "Is object/category x in the image?".

Several machine learning approaches have been applied to this problem, demonstrating significant improvements in object detection accuracy and speed.

In addition, most often just establishing the presence/ absence of objects is not enough and one desires to know also its exact locations in the image, or even independently detecting and localizing the parts of which the objects are composed.

As disclosed by P. Dollar and al. ("*Cascaded Pose Regression*") IEEE Computer Vision and Pattern recognition 2010 pp. 1078-1085, in its simplest form, localization consists of identifying the smallest rectangular region of the image that contains the searched object but more generally, one wishes to recover the objects "shape" and more precisely with an accurate orientation (orientation being also known by using the term "pose". Indeed, a changing of orientation/pose or of viewpoint leads to a completely different appearance of an object.

Shape refers to the geometric configuration of articulated objects (and the parts of which they are composed) for example the configuration of the limbs on a human body or the layout of a vehicle. More broadly, shape is any set of systematic and parameterizable changes in the appearance of the object.

To this purpose, landmarks estimation methods have been developed.

One of such landmarks estimation methods is the cascaded pose regression (CPR) technique as disclosed by P. Dollar, as cited above, also called shape estimation (where the term "shape" refers here to the set of landmarks locations characterizing the geometry of the face) and illustrated by FIG. 1 (disclosed by P. Dollar, as cited above) wherein each row 11, 12, 13 shows a test case culled from three different data sets.

Figure 1:
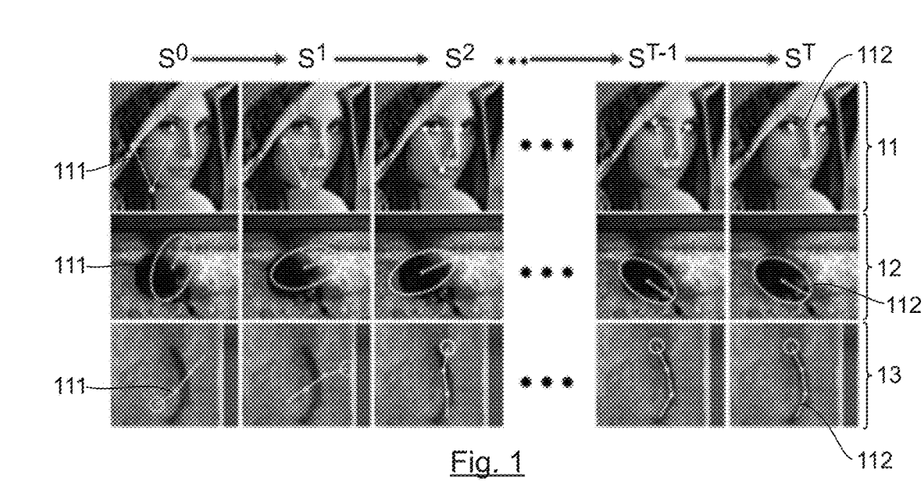
FIG. 1, already presented in relation with prior art, shows an example of shape estimation.

More precisely, the cascaded pose regression (CPR) is formed by a series of T successive regressors $R^{1 \cdots T}$ that start from a raw initial shape guess $S^0$ (111) and progressively refine estimation, outputting final shape estimation $S^T$ (112). Shape S is represented as a series of P part locations $S_p=[x_p, y_p]$, p∈1 . . . P. When CPR is applied to facial landmarks detection, these parts correspond to facial landmarks. At each iteration, a regressor $R^t$ takes as input a set of features computed on the face area in the current image and produces an update δS, which is then combined with previous iteration's estimate $S^{t-1}$ to form a new shape.

During learning, each regressor $R^t$ is trained to attempt to minimize the difference between the true shape and the shape estimate of the previous iteration $S^{t-1}$. The available features at the input to $R^t$ depend on the current shape estimate and therefore change in every iteration of the algorithm. Such features are known as pose-indexed or shape-indexed features. The key to the CPR technique lies on computing robust shape-indexed features and training regressors able to progressively reduce the estimation error at each iteration.

The robust cascaded pose regression (RCPR) is an algorithm derived from CPR and that deals with occlusions as disclosed by one the inventors, X. P. Burgos-Artizzu et al. ("*Robust face landmark estimation under occlusion*"), IEEE International Conference on Computer Vision, Sydney 2013. This method requires ground truth annotations for occlusion in the training set. So instead of defining a part location by only its x and y coordinates, a visibility parameter is added and can also be learned at the same time as the part locations.

Usually, such landmarks estimation methods are efficient when they are applied to a limited range of orientations/ poses of the object around a reference "neutral" pose.

To succeed in additionally estimating the orientation/pose with accuracy, several approaches can be applied.

On the one hand, a first approach consists in applying two successive steps, one for estimating the orientation/pose of a given test image, followed by a second step for computing shape using a landmark estimation model, obtained by using one of the landmarks estimation methods similar to the one as described above, said model being learned during a training phase performed only on training images presenting a similar orientation/pose as the given test image.

On the other hand, a second approach consists in obtaining, during a training phase, a different landmark estimation model for each orientation/pose, using for each model an appropriate set of training images, testing all the resulting landmark estimation models on a given test image and selecting the best performing one on the basis of some automatic or semi-automatic measure.

The drawback of both approaches is that they result in a very high processing cost and are time-consuming, which is unrealistic when considering real-time applications.

Thus, there remains a significant need for automatically determining both the shape and the pose/orientation of an object in an image while reducing the processing time and costs.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for determining the shape of an object represented in a current image, a plurality of landmarks being associated with said object.

Such a method comprises:
determining a plurality of features representative of said current image, said features being determined from at least a part of the plurality of landmarks,
obtaining information representative of the shape of the object by using at least one parameter representative of an estimation of the pose of the object in the current image, said at least one parameter being obtained by implementing a multivariate regression applied to at least a part of said features.

The present disclosure thus relies on a novel and inventive approach for the shape estimation of an object of a current image. Actually, the present disclosure benefits from the specific properties of a multivariate regression able to determine an estimation of the pose, which is then used to determine the shape of an object. In other words, the parameter representative of an estimation of the pose also contributes to the estimation of the shape of the object.

Thus, compared to the shape estimation techniques of the prior art, the proposed method enables to estimate landmarks robustly across all poses and viewpoints. In other words, shape is accurately estimated whatever the pose.

Moreover, the proposed method implements only a single step by using multivariate regression, which couples together both tasks of detecting the pose of an object and the task of determining the shape of such an object.

"Coupling both tasks" corresponds to the fact that both tasks: pose detection, on the one hand, and shape estimation, on the other hand, communicate between one another during the multivariate regression and learn from each other, resulting in more robust shape estimation since pose and shape are provided simultaneously.

In comparison with the techniques of the prior art, since both operations are performed at the same time for a current image, called "test" image in the following, the shape estimation is accelerated and accurate whatever the pose of the object and viewpoints, and can be thus performed "online".

It has to be noted that a "multivariate regression" according to the present disclosure corresponds to a regression outputting a plurality of variables at a time. More precisely, the multivariate regression according to the present disclosure delivers shape increments, which are added to provide a final shape estimate.

For instance, considering that the object corresponds to a human or animal face, sixty-eight landmarks will be used for example to annotate such a face, sixty-eight landmarks are used to delimit the shape of such a face.

Such landmarks are located in the image by using, for example, 2D coordinates such as a couple (x,y) corresponding respectively to the abscissa and the ordinate of one landmark.

For such an application, the "multivariate regression" will consist in providing a vector comprising one hundred and thirty-six values at a time (i.e. 136=68×2). In other words, the shape estimation according to the present disclosure will deliver simultaneously the coordinates of all the landmarks delimiting the shape of a detected object.

The method according to the present disclosure can be applied to an extremely wide range of applications for estimating the location and shape/orientation of an object in images/videos, which is the backbone of many visual recognition applications.

For instance, it can be applied to the detection of human or animal faces, or cars, or pedestrians in traffic scenes, to name just a few.

According to an embodiment of the present disclosure, said method comprises a previous training of said multivariate regression, said multivariate regression corresponding to at least one pose regressor, said training being performed by using a dataset of training images and, wherein said at least one parameter representative of an estimation of the pose of the object in the image is obtained by using a dimensionality reduction technique applied to a plurality of landmarks associated with an object represented in each training image of said dataset of training images.

Indeed, the multivariate regression can be trained separately from the implementation of the present disclosure, by a different device, and the trained multivariate regression is then provided as an input of said method.

Nevertheless, the present method can also implement the training of the used multivariate regression.

Such a training has to be performed before the steps of determining a plurality of features of the test image, which does not belong to the training images, and before the step of obtaining information representative of the shape of the object by using at least one parameter representative of an estimation of the pose of the object in the current image.

Said training is advantageously performed "offline" in order to permit a real time processing of the test image.

As indicated above, said trained multivariate regression corresponds to a pose regressor. In other words, such a pose regressor provides information representative of the pose, which corresponds to a change of orientation or of viewpoint of the object leading to a completely different appearance of an object. A pose can correspond for example to the set of yaw, roll, pitch angles, or the combination of a pitch and a scale, with respect to a reference image wherein the object is captured from a reference viewpoint.

In comparison with a shape regressor, which delivers at a time a vector of one hundred and thirty-six values (corresponding to sixty-eight landmarks of coordinates (x,y)), a pose regressor provides a vector of smaller size corresponding to a combination of possible poses. For example, the pose regressor provides three principal component values corresponding to the yaw, pitch and roll angles of the object with respect to a reference frontal viewpoint. The training of such a pose regressor is thus accelerated compared to a shape regressor.

In addition, as proposed according to the present disclosure, the at least one parameter representative of an estimation of the pose of the object is obtained by using dimensionality reduction techniques applied to a plurality of landmarks associated with an object represented in each training image.

The dimensionality reduction technique permits to reduce the complexity of computation and avoids the annotation of pose in the training images. In other words, only the landmark annotation of the images is required. For example, assuming that each training dataset image is annotated with the 2D locations of L landmarks for a total of L×2 values per image, dimensionality reduction extracts a set of B<<L×2 parameters representative of pose for each training image. If the training dataset comprises N images, the pose regressor is input with N×B parameters instead of N×L×2 for shape regressors. Accordingly, its complexity is substantially reduced.

The training of the pose regressor will be thus accelerated. In addition, it has to be noted that since such training of the multivariate regression implements such a dimensionality reduction technique providing a computation in a space of reduced dimensionality, the proposed method will re-use such a computation space of reduced dimensionality for projection during the test phase.

In addition, said training permits to define the number of features that have to be determined during the test phase, to be then used as an input of the trained multivariate regression.

More precisely, a feature is associated with at least one landmark used to delimit an object's shape. According to the present disclosure such a feature describes the area of the image comprising the at least one landmark associated with it.

During the training of the multivariate regression, some features appear to be more discriminative than others. Thus, when the multivariate regression is trained and ready to be used during a test phase, only the most discriminative features are determined.

According to a particular aspect of said embodiment, said dimensionality reduction technique is a principal component analysis.

Principal Component Analysis (PCA), as disclosed by K. Pearson ("*On lines and planes of closest fit to system of points in space*") Philosophical Magazine, 1901, is a statistical procedure that uses an orthogonal transformation to convert a set of observations of possibly correlated variables into a set of values of linearly uncorrelated variables called Principal Components (which we will be referred to as "PC" in the following of the present disclosure).

Such an operation can be thought of as revealing the internal structure $I_s$ of the data in a way that best explains the variance in the data. $I_s$ consists of an orthogonal linear transformation that transforms the data to a new coordinate system such that the greatest variance by some projection of the data comes to lie on the first coordinate (called the first principal component), the second greatest variance on the second coordinate, and so on.

Since each Principal Component is an orthogonal projection, it is easy to freely move back and forth between the "PC-space" and the original landmark space.

In addition, the Principal Component Analysis performs a linear dimensionality reduction wherein said "PC-space" corresponds to a rotation of the landmark space, and also presents a reduced dimension in comparison with said landmark space. In other words, a bijective relationship, implementing an invertible transformation, is established between the "pose space" (i.e. the PC space) and the "shape space" (i.e. the landmark space) and inversely. However, shape information (corresponding to non-rigid deformations of the landmark set) remains richer than pose (corresponding to a rigid transformation of the landmarks set, which can be represented by just 3 rotations).

With respect to the number of components of the landmark space, the PC space comprises only very few principal components, since only the principal components explaining the largest variance of the data are retained leading thus to the dimensionality reduction covered by the present disclosure. For instance, considering the particular case wherein facial landmark estimation is aimed at, only three principal components corresponding to the yaw, pitch and roll angles of the head pose are sufficient to explain most of the variance of the data. Thus, the method, according to the present disclosure, proposes to determine, during a training phase, a Principal Components space where the 2L×1 vectors of landmark locations of each training image become linearly uncorrelated. In this new space, the axes that explain the largest proportion of the data variance are representative of the pose/orientation of the object annotated in the dataset. The coordinates of an image annotation along these principal axes can thus be used as proxies to represent the object pose.

It has to be noted that other linear dimensionality reduction techniques could be used in a similar way instead of the Principal Component Analysis, such a singular value thresholding technique as disclosed by J. Cai et al ("A singular value thresholding algorithm for matrix completion", arXiv: 0810.3286, 2008, or the auto-encoder technique as disclosed by Y. Bengio ("*Learning deep Architectures for AI*") Foundations and Trends in Machine Learning (2009).

A great number of non-linear dimensionality reduction approaches also exists, such as the locally linear Embedding dimensionality reduction technique as disclosed by S. T. Roweis and al. ("*Nonlinear Dimensionality Reduction by Locally Embedding*") Science Vol 290, 22 Dec. 2000, 2323-2326, or such as the Kernel Principal Component Analysis as disclosed by B. Schölkopf and al. ("*Nonlinear Component Analysis as a Kernel Eigenvalue Problem*") Neural computation 10(5): 1299-1319, 1998, MIT Press Cambridge, Mass. USA.

According to a particular aspect of said embodiment, said training images comprise at least one object previously manually annotated with ground-truth landmarks.

Thus, since the coordinates associated with the first principal directions of PC-space provide proxies for the object pose, during the training only a manual annotation with ground-truth landmarks of the training images is required, while no pose annotation is required. Such manual annotation provides thus the true shapes of each object of each training images. Once all these ground-truth landmarks are obtained, they are then processed, according to, for example the dimensionality reduction technique corresponding to the principal component analysis as described above.

According to another particular aspect of said embodiment, said training of said multivariate regression and said applying of said multivariate regression to said current image, are iterative, implementing a plurality of iterations, wherein, from the second iteration, each iteration uses the result of the previous iteration.

In other words, the steps of the training phase and the steps of the test phase, are respectively iterated to obtain a refinement.

Moreover, during the test phase, each iteration uses the result of the previous iteration of the test phase and thus corresponds to an update of both the pose and shape estimation.

In addition, at each iteration during the test phase, the multivariate regressor, which has been trained in the corresponding iteration of the training phase, is applied to the features of the test image.

According to another embodiment, during at least one iteration of said applying of said multivariate regression to said current image, said information representative of the shape of the object represented in said current image is directly obtained by using another multivariate regression, corresponding to a shape regressor, applied to at least a part of said features, the use of said shape regressor being selected according to a value of a selection bit provided by a corresponding training iteration.

Such a shape regressor providing directly the shape is used during the test phase, for example, when the training phase as determined that a pose regressor is less efficient than a shape regressor at a stage (i.e. iteration) of the iterative process.

Such a switch between pose regressor and shape regressor during the test phase is controlled by a value of a selection bit provided by the training phase for each iteration.

According to a particular aspect of this embodiment, information representative of a pose of the object is then obtained using said information representative of the shape of the object directly obtained by using said shape regressor. In other words, the output of shape regressor corresponding to a shape estimation can be projected into the pose space (i.e. the "PC space"). Moreover, in the particular case wherein said multivariate regression is iterative the output of a shape regressor used at a current iteration is projected into the pose space to feed the pose regressor of the following iteration.

Thus, contrary to other iterations, wherein the shape is obtained from the pose using the bijective relationship between pose-space and shape-space, during the iteration wherein a shape regressor is used, the pose is then obtained from the shape.

According to another particular aspect of this embodiment said value of said selection bit is predetermined or set manually by an operator.

Such a forced setting of the selection bit during the training phase provides control of the computation time in the test phase, especially with regard to the fact that pose regression, yielding an output vector of reduced dimension, is faster to compute than shape regression.

According to another particular aspect of this embodiment, said value of said selection bit is determined during each iteration of said training by comparing:
  the error associated to the difference between said at least one parameter representative of an estimation of the pose of the object obtained by using said pose regressor with a true pose of said object in said training images, with
  the error associated to the difference between said information representative of the shape of the object obtained by using said shape regressor and a true shape of said object in said training images.

Such an aspect permits to increase the accuracy of the training, at the expense of extra processing time to compute the errors.

According to another particular aspect of this embodiment, said pose regressor, providing said at least one parameter representative of an estimation of at least one of the pose angles, and said shape regressor, providing directly said information representative of the shape of the object represented in said current image, are of a same type or are of a different type.

For example, shape regressor (or shape regressors, if several iterations use distinct shape regressors) and pose regressor (or pose regressors, if several iterations use distinct pose regressors) can be of the same type corresponding to a fern regressor as disclosed by M. Ozuysal et al. ("Fast Key-point recognition using random ferns" IEEE Transactions on Pattern Analysis and Machine Intelligence, Volume 32, Issue 3, pp. 448-467, 2009, or to a binary decision tree as disclosed by L. Breiman et al. ("Classification and regression trees" Wadsworth Ed. 1984, or to a linear regression etc., or for instance the shape regressor(s) is(are) of the fern regressor type, and the pose regressor(s) is(are) of the binary decision tree type.

According to an aspect of the present disclosure, said features are shape-indexed by using a reference shape as an input to said multivariate regression.

Shape-indexed features (or pose-indexed features in the scope of the present disclosure), first introduced by F. Fleuret et al. ("*Stationary features and cat detection*") Journal of Machine Learning Research volume 9 pp 2549-2578, 2008, are weakly-invariant to shape/pose and therefore the features computation can be obtained directly from a reference shape, which is predetermined during an initial phase and then used as an input for the method according to the present disclosure.

For instance, the type of said shape-indexed features belongs to the group comprising:
  a histogram of oriented gradients,
  a scale invariant image transform,
  a channel feature,
  a simple control point feature.

The histogram of oriented gradients, as disclosed by N. Dalal et al. ("*Histograms of oriented gradients for human detection*"), IEEE Conference on computer Vision and Pattern Recognition, 2005, is a feature descriptor used in computer vision for object detection.

The main idea behind the Histogram of Oriented Gradients (HOG) descriptor is that the local appearance of objects as well as the shape within an image can be described by the distribution of intensity gradients or edge directions. Hence, the image is divided into small regions called cells, the user can choose the size of these cells, as well as the overlap between two adjacent cells, and the number of orientation bins for each histogram. Then, a histogram of gradient directions is compiled for the pixels within each cell. The final vector of features is the concatenation of all these histograms. In order to overcome the problem of changes in illumination and shadowing, an histogram equalization can be performed on the whole image before the extraction of HOG features.

A feature corresponding to a Scale Invariant Image Transform (SIFT) is disclosed by D. G Lowe ("*Distinctive image features from scale-invariant key-points*") International Journal of computer Vision, volume 60, issue 2, pp 91-110, 2004. Such shape-indexed features correspond to the transformation of image data into scale-invariant coordinates relative to local features.

Channel features are disclosed by P. Dollar et al. ("*The fastest pedestrian detector in the west*") Proceedings of British Machine Vision conference BMVC 2 (3), 2010. Such a channel feature corresponds to the weighted sum of a channel image, a channel image being obtained by applying a shift-invariant function to an inputted image.

Simple control point features as described by M. Ozuysal et al. ("Fast Keypoint recognition using random ferns") IEEE Transactions on Pattern Analysis and Machine Intelligence, volume 32, issue 3, pp 448-461, 2009 can also be used.

According to a particular variant of said aspect, said method further comprises a previous determining of said reference shape by detecting said object in said current image.

Another aspect of the present disclosure pertains to a device for determining the shape of an object represented in a current image, said device comprising a processor configured to control:
  a module for determining a plurality of features representative of said current image, said features being determined from at least a part of the plurality of landmarks;

a module for obtaining information representative of a shape of the object by using at least one parameter representative of an estimation of the pose of the object in the current image, said at least one parameter being obtained by implementing a multivariate regression applied to at least a part of said features.

Such a device is adapted especially for implementing the method for processing an image of pixels.

The present disclosure also concerns a computer program product downloadable from a communication network and/or recorded on a medium readable by a computer and/or executable by a processor, comprising program code instructions for implementing a method for processing an image of pixels.

The present disclosure also concerns a non-transitory computer-readable medium comprising a computer program product recorded thereon and capable of being run by a processor, including program code instructions for implementing a method for processing an image of pixels.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specific nature of the disclosure as well as other objects, advantages, features and uses of the disclosure will become evident from the following description of embodiments taken in conjunction with the accompanying drawings.

4. BRIEF DESCRIPTION OF THE DRAWINGS

Embodiments of the disclosure can be better understood with reference to the following description and drawings, given by way of example and not limiting the scope of protection, and in which.

Similar or same elements are referenced with the same reference numbers. The components in the figures are not necessarily to scale, emphasis instead being placed upon illustrating the principles of the disclosure.

5. DETAILED DESCRIPTION 5.1 General Principle

The general principle of the present disclosure consists in a new way for determining both the pose and the shape of an object represented in a current image, in real-time, by coupling together the pose and shape estimation. A major advantage of this approach is that it can efficiently deal with a wide range of object poses.

Such a coupling is obtained by using a pose-space and a shape-space representation of the object landmarks, the conversion from one space to the other being obtained by a linear and invertible relationship. Since the pose estimation is faster and efficient for covering a large percentage of the variance between a true pose and an estimation pose, the present disclosure aims principally at determining at least one parameter representative of an estimation of the pose and then obtain directly an estimation of the shape using the pose estimation result.

A description will now be given of a method, a corresponding device and a computer-readable storage medium for processing an image of pixels.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for processing an image of pixels but extends to the processing of a plurality of images of pixels within a sequence of images because each image belonging to said sequence is sequentially processed as described below.

The Method for Determining the Shape of an Object in a Test Image

Figure 2:
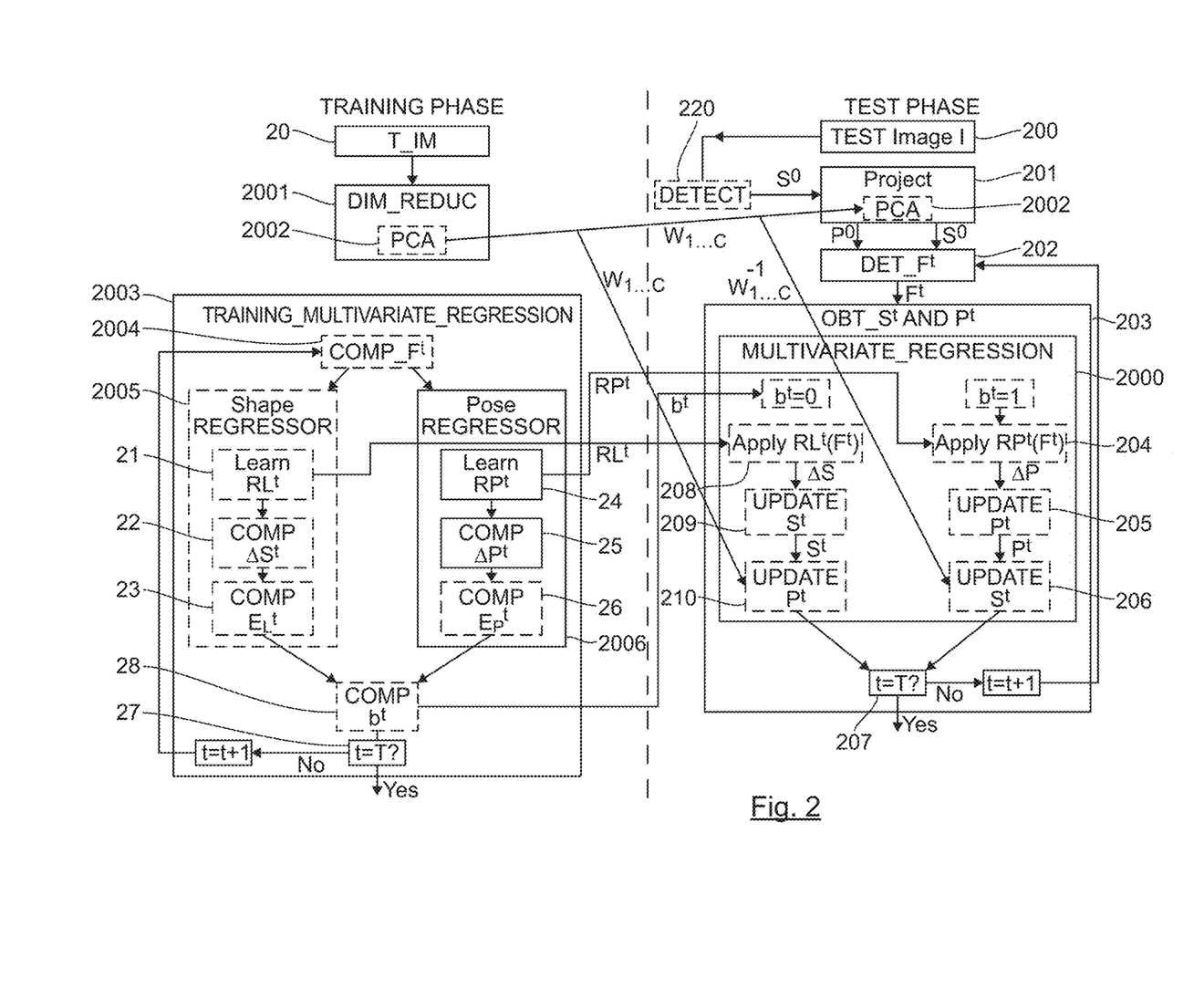
FIG. 2 shows schematically a diagram of the main steps of the method for processing an image of pixels according to the present disclosure.
Figure 3A:
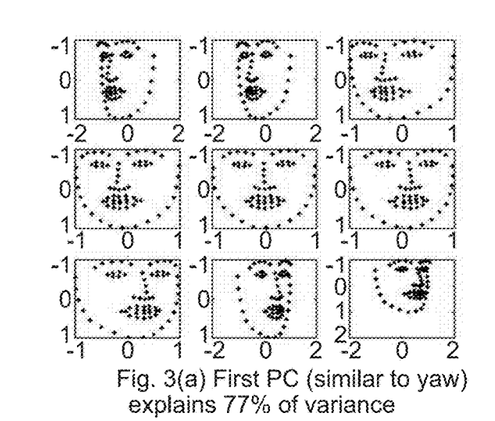
FIGS. 3(a)-(d) illustrate the first four principal components in landmarks space using a typical training face dataset.
Figure 3B:
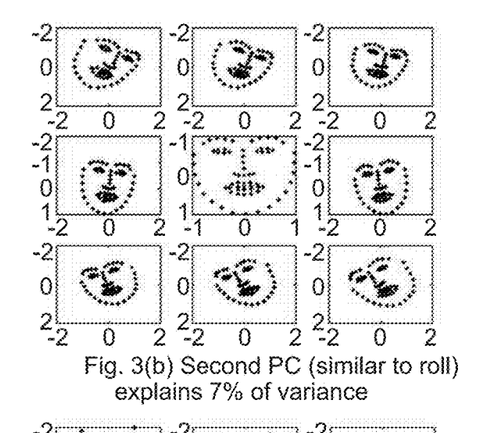
Figure 3C:
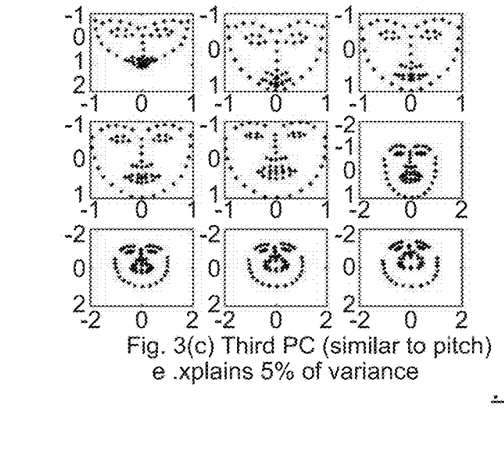
Figure 3D:
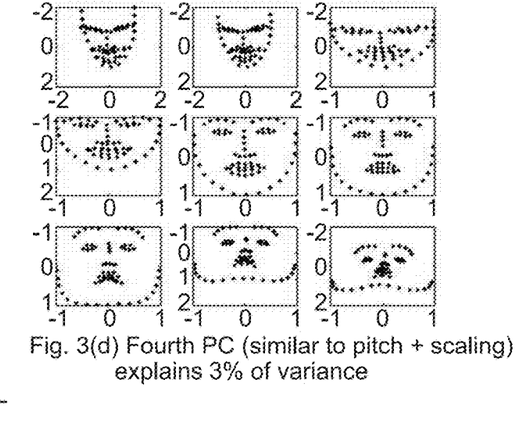

FIG. 2 shows schematically a diagram of the main steps of the method for determining the shape of an object represented in a current image according to one particular embodiment of the present disclosure, said method being performed by a device for determining the shape of an object represented in a current image, called test image I (200) in the following.

According to the present disclosure, the method for processing a test image I (200) can be advantageously performed online and consists in applying a trained multivariate regression (2000).

Annex A, which forms an integral part of the present description, proposes a practical example of program code instructions for implementing the method during the test phase according to the present disclosure.

During the test phase, as represented on the right of FIG. 2, an initial guess, called in the following a reference shape $S^0$ is projected (201) into a space, whose dimension is reduced in comparison with the dimension of the landmark space.

Such a reference shape $S^0$ can be predetermined by another device or optionally obtained (as represented in dotted lines) by an object detection (220) implemented by a detector of the device according to the present disclosure, said detector providing a coarse localization of this object.

For example, such an object is a face and the detector is a face detector.

Such a space of reduced dimension is determined during a training phase (as represented on the left of FIG. 2).

Said training phase can be implemented by another device than the one of the present disclosure, which in this case is only dedicated to test phase, or can optionally be implemented by the device according to the present disclosure. Said training (2003) is advantageously performed offline once and for all and is valuable for later testing any test image (200).

During said training phase, a dataset (20) of N training images $I^1 \cdots ^N$ is used as an input to a dimensionality reduction (2001) followed then by the training (2003) of the multivariate regression.

It has to be noted that said dataset (20) of N training images comprises images captured with different orientations/poses or viewpoints.

For example, each training image comprises at least a human face, manually annotated with L ground-truth landmarks, encoded as a "shape vector" S of (x,y) pixel coordinates in the image: $S=<x,y>\in R^{2L}$.

Previously to the training step (2003) as such a dimensionality reduction technique is applied (2001) to the L landmarks associated the at least human face represented in each training image of the dataset (20).

Different dimensionality techniques can be applied as listed previously in the present disclosure. According to the embodiment represented on FIG. 2, said dimensionality reduction technique is a Principal Component Analysis (PCA) (2002).

Applying PCA to the training shapes, results in a 2L×2L change-of-basis matrix w, wherein 2L=L*2, (x and y coordinates of each one of the L landmarks). This matrix contains the L2 Principal Components (PC) discovered, each represented as a vector in landmark-space. More specifically, each column c of matrix w (denoted $w_C$) contains a single PC represented as a vector in landmark space (i.e. $w_C \in R^{2L}$).

Such principal components (or column $w_C$ of the matrix w) are ordered during the training phase by amount of data variance explained among the training images. In other words, the vectors of the PCA basis are ordered in the matrix w in such a way that each vector retains the maximal residual variance of the data, and thus provides an optimal "summary" of the data in the least squares sense. Thus, it is straightforward dimensionality reduction by retaining only the first basis vectors (which "explain" a large proportion of the data variance).

As illustrated by the illustration (a), (b), (c), and (d) of FIG. 3, the PCs that explain 77%, 7%, 5% and 3% of the training images correspond respectively to the first column $w_1$, $w_2$, $w_3$, $w_4$ of the matrix w. More precisely, the first Principal Component (PC) FIG. 3(*a*) is similar to yaw, the second PC FIG. 3(*b*) is similar to roll, the third PC FIG. 3(*c*) is similar to pitch, and the fourth PC FIG. 3(*d*) is similar to pitch combined with scaling.

It has to be noted that one of the fundamental insights of the present disclosure is that principal components can be used as an automatic way of discovering head pose and other typical variations. Indeed, it was determined by applying PCA to a large dataset of facial landmark annotations that the first principal components are extremely close to the variations of the shape in yaw, roll and pitch respectively. This is illustrated on FIG. 3. Thus, the projections of a shape vector onto the directions corresponding to the first principal component vectors provide good approximations to the rotation angles defining the face pose.

Moreover, since PCA is an orthogonal transformation, it is easy to freely move back and forth between PC-space and the original data space. For example, given a shape vector, the associated weight of each PC can be computed by solving $P_C = S \times w_C$ for each c (where $P_C$ and S are both row vectors in $\in R^{2L}$). Similarly, given the vector $P \in R^C$ of PC weights (using the first C from all PCs available), since w is invertible, a plausible corresponding shape can be obtained by computing $S = w_{1 \ldots C}^{-1} \times P$, wherein $S = w_{1 \ldots C}^{-1}$ is formed by the first C columns of the inverse of w. Note that when matrix w is the result of linear PCA, w is guaranteed to be an orthogonal matrix and therefore the inverse $w^{-1}$ is equivalent to the matrix transpose. In other cases, the Moore-Penrose pseudoinverse might be needed to invert the matrix. In a preferred embodiment, the number C of principal components adequately representing the pose variations of the training dataset is set to three. With this choice, the projections of a shape vector representing the landmark annotations of a face image on these principal components provide good approximations to the yaw, roll and pitch angles defining the pose of the face respectively, (as shown on FIG. 3). The restriction of the PCA space to the subspace spanned by its first C=3 basis vectors effectively provides a reduced dimensionality pose-space (2001, 2002).

Thus, the present disclosure aims at combining these two notions of shape and pose to improve the classical CPR technique as cited above by determining a shape during a test phase from a parameter P representative of the pose.

During the test phase (as represented on the right of FIG. 2) the initial reference pose $P_C$ is obtained from the annotated landmark shape vector S as $P_C = w_{1 \ldots C} \cdot S$ by using the matrix $w_{1 \ldots C}$ computed (2002) once and for all during the principal component analysis performed during the training phase.

Then, the method proposed according to the present disclosure, implements during the test phase the determining (202) of a plurality of features $F^t$ representative of said test image (200).

More precisely, said features are shape-indexed by using the reference shape $S^0$ as an input. It has to be noted that the same technique to obtain (2004) shape-indexed features is used in the training phase and in the test phase (during the step of determining (202)).

For example, said shape-indexed features correspond to interpolated shape-indexed features, as disclosed by X. P. Burgos-Artizzu et al. ("*Robust face landmark estimation under occlusion*"), IEEE International Conference on Computer Vision, Sydney 2013.

Once features are computed (202), the step of obtaining (203) information $S^t$ representative of the shape of the object by using at least one parameter $P^t$ representative of an estimation of the pose of the object (i.e. for example face) of the test image I (200) is performed by applying the trained multivariate regression (2000).

As illustrated on FIG. 2, the training (2003) like the use (203) of said trained multivariate regression (203) are iterative (27, 207).

In other words, during the test phase, each iteration uses the result of the previous iteration (as can be seen on steps 6 or 10 of Annex A) and thus corresponds to an update (205, 206) of both the pose $P^t$ and shape $S^t$ estimation (the shape being obtained directly from the pose using the bijective relationship as described above).

In addition, at each iteration during the test phase, the multivariate regression applies, to the test image, the pose regressor $RP^t$, which has been trained in the corresponding iteration of the training phase.

Such pose regressor $RP^t$ works in a pose space whose dimension is reduced in comparison to the landmark space, which results in a gain of processing time.

Thus, starting from an initial shape guess $S^0$, the pose is progressively refined using shape-indexed features determined at each iteration by taking as an input the shape updated at the previous iteration.

Optionally (as represented with dotted lines on FIG. 2), during at least one iteration t said applying (203) of said multivariate regression to said test image (200) implements a shape regressor $RL^t$ instead of a pose regressor $RP^t$.

The use of such a shape regressor $RL^t$, operating in the landmark space instead of the PC space, wherein the pose regressor $RP^t$ operates, is controlled by a value of a selection bit $b^t$ provided per iteration t by the training (2003) step of the training phase.

For instance, when $b^t = 0$ the shape regressor $RL^t$ is used, while when $b^t = 1$ the pose regressor $RP^t$ is used.

Such a shape regressor providing directly the shape is used during a given iteration of the test phase when the training phase has determined that a pose regressor is less efficient than a shape regressor at this iteration.

For example, the training phase could determine that a pose regression is more efficient than a shape regression in the first four iterations; thus, pose regressors $RP^1$, $RP^2$, $RP^3$, $RP^4$ would be used at iterations t=1, t=2, t=3, t=4 respectively, corresponding to $b^1 = b^2 = b^3 = b^4 = 1$.

As an example, the first pose regressor $RP^1$ obtained at the first iteration implements a first triplet of values for combining the three first PCs as represented on FIG. 3, simultaneously adjusting yaw, roll and pitch angles to update the pose $P^1$, which is then feed to the input of the second pose regressor $RP^2$ used at the second iteration.

At the second iteration, the second pose regressor $RP^2$ implements a second triplet (different from the first triplet) of the three first PCs to update the pose $P^2$, which is then feed to the input of the third pose regressor $RP^3$ used at the third iteration.

At the third iteration, the third pose regressor $RP^3$ implements a second triplet (different from the second triplet) of the three first PCs to update the pose $P^3$, which is then feed to the input of the fourth pose regressor $RP^4$ used at the third iteration.

At the fourth iteration, the fourth pose regressor $RP^4$ implements a fourth triplet (different from the third triplet) of the three first PCs to update the pose $P^4$, which is then transformed as the shape $S^4$ by projection from the PC-space to the landmark space by using the inverse $w_{1 \ldots C}^{-1}$, said shape $S^4$ being then used as the input of the shape regressor $RL^5$ $b^5 = 0$, while being longer to compute, is more efficient to reduce the remaining variance.

In the particular optional case wherein a shape regressor $RL^5$ is used at the fifth iteration during the testing phase, said shape regressor $RL^5$ delivers a shape regression delta $\Delta S$ permitting to transform the shape $S^4$ (delivered by the update (206) of the fourth iteration implementing the pose regressor RP⁴ delivering (204) first the pose regression delta ΔP for obtaining the updated (205) pose parameter P⁴), into the updated (209) shape S⁵.

According to the embodiment represented on FIG. 2, the value of the selection bit $b^t$ is obtained (28) during the training step (2003) of the training phase represented on the left of FIG. 2.

More precisely, during this training step (2003), at each iteration, shape and pose regressors (2005, 2006) are learned (21, 24) separately, for instance in parallel, and then for each of these regressors a shape regression training delta and a pose regression training delta are computed (22, 25) and then used to determine on the one hand the error $E_P^t$ associated to the difference between said at least one parameter representative of an estimation of the pose of the object obtained by using said pose regressor with a true pose of said object in said training images, and on the other hand the error $E_L^t$ associated to the difference between said information representative of the shape of the object obtained by using said shape regressor and a true shape of said object in said training images.

Then by comparing these two errors $E_P^t$ and $E_L^t$, $b^t=0$ if $E_L^t < E_P^t$ and $b^t=1$ if $E_P^t < E_L^t$.

Thus, comparing the present embodiment of the disclosure with the techniques of the prior art, the difference is that an alternation between regressing on the landmarks directly and on the PC values is performed. Which one will be performed at each iteration is learned during training, picking each time the one providing greater gains (reduced regression error loss). This information is stored as a single bit for each iteration (regression type to be used $b^1 \cdots \overline{T}$).

This alternate regression creates a substantial difference in performance. Regressing on the PC values directly achieves a two-fold improvement with respect to landmarks:
- faster convergence rates. Typically, the number of PCs used is much smaller than the number of landmarks C<<L2, therefore regression is simpler and faster.
- treating fundamentally different shapes separately. For similar reasons, the regressors will have a much easier time at separating the data into classes with low intra-class variance, improving the robustness of the learned model.

These improvements mean that the method proposed according to the present disclosure, will converge sooner and be more robust to data variations of any type. Moreover, the method outputs not only the face landmarks, but also an approximation to head pose (as can be seen in FIG. 3, PC values naturally encode head pose and other sources of variation).

Structures of the Device for Processing an Image of Pixels

On FIG. 2, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively « Application Specific Integrated Circuit », « Field-Programmable Gate Array », « Very Large Scale Integration », or from several integrated electronic components embedded in a device or from a blend of hardware and software components.

Figure 4:
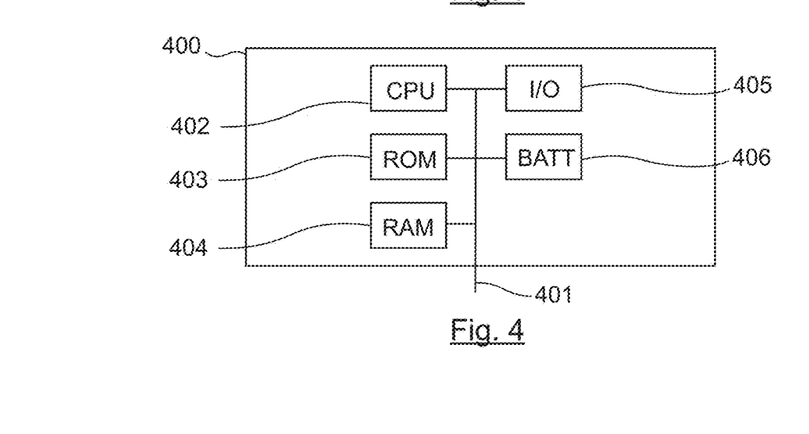
FIG. 4 shows an example of architecture of a device in accordance with an embodiment of the disclosure.

FIG. 4 represents an exemplary architecture of a device 500, which may be configured to implement a method for processing an image of pixels as described in relation with FIG. 2.

Device 400 comprises following elements that are linked together by a data and address bus 401:
- a microprocessor 402 (or CPU), which is, for example, a DSP (or Digital Signal Processor);
- a ROM (or Read Only Memory) 403;
- a RAM (or Random Access Memory) 404;
- an I/O interface 405 for transmission and/or reception of data, from an application; and
- a battery 406.

According to a variant, the battery 506 is external to the device. Each of these elements of FIG. 4 is well known by those skilled in the art and won't be disclosed further. In each of mentioned memory, the word « register » used in the specification can correspond to area of small capacity (some bits) or to very large area. ROM 403 comprises at least a program and parameters. Algorithm of the methods according to the disclosure is stored in the ROM 403. When switched on, the CPU 402 uploads the program in the RAM and executes the corresponding instructions.

RAM 404 comprises, in a register, the program executed by the CPU 402 and uploaded after switch on of the device 400, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment, said image of pixels is obtained from a source. For example, the source belongs to a set comprising:
- a local memory (403 or 404), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (405), e.g. a wire line interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments, a bitstream delivered by said device is sent to a destination. As an example, said bitstream is stored in a local or remote memory, e.g. a video memory (404) or a RAM (504), a hard disk (503). In a variant, said bitstreams is sent to a storage interface, e.g. an interface with a mass storage, a flash memory, ROM, an optical disc or a magnetic support and/or transmitted over a communication interface (405), e.g. an interface to a point to point link, a communication bus, a point to multipoint link or a broadcast network.

Implementations of the various processes and features described herein may be embodied in a variety of different equipment or applications. Examples of such equipment includes said device, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, resident software, micro-code, and so forth, or an embodiment combining software and hardware aspects that can all generally be referred to herein as a "circuit", "module", or "system".

When the present principles are implemented by one or several hardware components, it can be noted that a hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

ANNEX A input : Image I, initial guess $S^0$ (obtained from the result of a face detector), trained landmark regressors $RL^{1..T}$, trained pose regressors $RP^{1..T}$, regressor types $b^{1..T}$, principal component matrix w, shape-indexed feature function $f(I,S)^{1..T}$ // project S into PCA space 1  $P^0 = S^0 \times w_{1..C}$ 2  for t = 1 to T do    | // compute shape-indexed features

ANNEX A

```
 3  |   F' = f'(I,S^{t-1})
    |   // check regressor type
 4  |   if b' == 0 then
    |   |   // evaluate landmark regressor
 5  |   |   ΔS = RL'(F')
    |   |   // Update landmarks
 6  |   |   S' = S^{t-1} + ΔS
    |   |   // Update PC weights from landmarks
 7  |   |   P' = S' × w_{1..C}
 8  |   else
    |   |   // evaluate pose regressor
 9  |   |   ΔP = RP'(F')
    |   |   // Update PC weights
10  |   |   P' = P^{t-1} + ΔP
    |   |   // Update landmarks from PC weights
11  |   |   S' = w_{1..C}^{-1} × P'
12  |   end
13  end
    output:   final estimation S^T (landmarks) amd P^T (head pose
              approximation)
```

The invention claimed is:

1. A method for determining the shape ($S^t$) of an object represented in a current image, a plurality of landmarks being associated with said object, the method comprising:
   training of a multivariate regression, said multivariate regression corresponding to at least one pose regressor ($RP^t$), said training being performed by using a dataset of training images and, wherein at least one parameter ($P^t$) representative of an estimation of a pose of the object in the image is obtained by using a dimensionality reduction technique applied to a plurality of landmarks associated with an object represented in each training image of said dataset of training images;
   determining a plurality of features ($F^t$) representative of said current image, said features being determined from at least a part of the plurality of landmarks,
   obtaining information representative of the shape ($S^t$) of the object by using said at least one parameter ($P^t$) representative of an estimation of the pose of the object in the current image, said at least one parameter being obtained by implementing the trained multivariate regression applied to at least a part of said features ($F^t$).

2. The method for determining the shape of an object represented in said current image according to claim 1, wherein said dimensionality reduction technique is a principal component analysis.

3. The method for determining the shape of an object represented in said current image according to claim 1, wherein said training images comprises at least one object previously manually annotated with ground-truth landmarks.

4. The method for determining the shape of an object represented in said current image according to claim 1, wherein said training of said multivariate regression and said applying of said multivariate regression to said current image, are iterative, implementing a plurality of iterations, wherein, from the second iteration, each iteration uses the result of the previous iteration.

5. The method for determining the shape of an object represented in said current image according to claim 4, wherein during at least one iteration of said applying of said multivariate regression to said current image, said information ($S^t$) representative of the shape of the object represented in said current image is directly obtained by using another multivariate regression, corresponding to a shape regressor ($RL^t$), applied to at least a part of said features, the use of said shape regressor being selected according to a value of a selection bit $b^t$ provided by a corresponding training iteration.

6. The method for determining the shape of an object represented in said current image according to claim 5, wherein information ($P^t$) representative of a pose of the object is then obtained using said information ($S^t$) representative of the shape of the object directly obtained by using said shape regressor ($RL^t$).

7. The method for determining the shape of an object represented in said current image according to claim 5, wherein said value of said selection bit ($b^t$) is predetermined or set manually by an operator.

8. The method for determining the shape of an object represented in said current image according to claim 5, wherein said value of said selection bit ($b^t$) is determined during each iteration of said training by comparing:
   the error ($E_P^t$) associated to the difference between said at least one parameter representative of an estimation of the pose of the object obtained by using said pose regressor with a true pose of said object in said training images, with
   the error ($E_L^t$) associated to the difference between said information representative of the shape of the object obtained by using said shape regressor and a true shape of said object in said training images.

9. The method for determining the shape of an object represented in an image according to claim 5, wherein said pose regressor, providing said at least one parameter representative of an estimation, and said shape regressor, providing directly said information representative of the shape of the object represented in said current image, are of a same type or are of a different type.

10. The method for determining the shape of an object represented in an image according to claim 1, wherein said features are shape-indexed by using a reference shape as an input of said multivariate regression.

11. The method for determining the shape of an object represented in an image according to claim 8, wherein said method further comprises a previous determining of said reference shape by detecting said object in said current image.

12. A device for determining the shape of an object represented in a current image, said device comprising a processor configured to:
   train a multivariate regression, said multivariate regression corresponding to at least one pose regressor ($RP^t$), said training being performed by using a dataset of training images and, wherein at least one parameter ($P^t$) representative of an estimation of a pose of the object in the image is obtained by using a dimensionality reduction technique applied to a plurality of landmarks associated with an object represented in each training image of said dataset of training images;
   determine a plurality of features representative of said current image, said features being determined from at least a part of the plurality of landmarks;
   obtain information representative of a shape of the object by using said at least one parameter representative of an estimation of the pose of the object in the current image, said at least one parameter being obtained by implementing the trained multivariate regression applied to at least a part of said features.

13. The device for determining the shape of an object represented in said current image according to claim 12, wherein said dimensionality reduction technique is a principal component analysis.

14. The device for determining the shape of an object represented in said current image according to claim 12, wherein said training images comprises at least one object previously manually annotated with ground-truth landmarks.

15. The device for determining the shape of an object represented in said current image according to claim 12, wherein said training of said multivariate regression and said applying of said multivariate regression to said current image, are iterative, implementing a plurality of iterations, wherein, from the second iteration, each iteration uses the result of the previous iteration.

16. The device for determining the shape of an object represented in said current image according to claim 15, wherein during at least one iteration of said applying of said multivariate regression to said current image, said information ($S^r$) representative of the shape of the object represented in said current image is directly obtained by using another multivariate regression, corresponding to a shape regressor ($RL^r$), applied to at least a part of said features, the use of said shape regressor being selected according to a value of a selection bit $b^r$ provided by a corresponding training iteration.

17. The device for determining the shape of an object represented in said current image according to claim 16, wherein information ($P^r$) representative of a pose of the object is then obtained using said information ($S^r$) representative of the shape of the object directly obtained by using said shape regressor ($RL^r$).

18. The method for determining the shape of an object represented in said current image according to claim 16, wherein said value of said selection bit ($b^r$) is predetermined or set manually by an operator.

19. The device for determining the shape of an object represented in said current image according to claim 16, wherein said value of said selection bit ($b^r$) is determined during each iteration of said training by comparing:
   the error ($E_P^{\ t}$) associated to the difference between said at least one parameter representative of an estimation of the pose of the object obtained by using said pose regressor with a true pose of said object in said training images, with
   the error ($E_L^{\ t}$) associated to the difference between said information representative of the shape of the object obtained by using said shape regressor and a true shape of said object in said training images.

20. The device for determining the shape of an object represented in an image according to claim 16, wherein said pose regressor, providing said at least one parameter representative of an estimation, and said shape regressor, providing directly said information representative of the shape of the object represented in said current image, are of a same type or are of a different type.

21. The device for determining the shape of an object represented in an image according to claim 12, wherein said features are shape-indexed by using a reference shape as an input of said multivariate regression.

22. The device for determining the shape of an object represented in an image according to claim 19, wherein said processor is further configured to previously determine said reference shape by detecting said object in said current image.

23. A non-transitory computer-readable medium comprising a computer program product recorded thereon and capable of being run by a processor, including program code instructions for implementing the steps of the method for detecting at least one fitting error according to claim 1 when it is executed by a processor.

* * * * *